(12) United States Patent
Blane

(10) Patent No.: US 11,047,449 B2
(45) Date of Patent: Jun. 29, 2021

(54) ENGINE COUNTERBALANCED BY UNBALANCED CRANKSHAFT MOUNTED ACCESSORY

(71) Applicant: Kevin Blane, Murfreesboro, TN (US)

(72) Inventor: Kevin Blane, Murfreesboro, TN (US)

( * ) Notice: Subject to any disclaimer, the term of this patent is extended or adjusted under 35 U.S.C. 154(b) by 0 days.

(21) Appl. No.: 16/663,037

(22) Filed: Oct. 24, 2019

(65) Prior Publication Data

US 2021/0123499 A1 Apr. 29, 2021

(51) Int. Cl.
| | |
|---|---|
| *F02B 75/06* | (2006.01) |
| *F16F 15/26* | (2006.01) |
| *G01M 15/04* | (2006.01) |
| *F02N 11/04* | (2006.01) |

(52) U.S. Cl.
CPC ............ *F16F 15/264* (2013.01); *F02B 75/06* (2013.01); *B60L 2240/421* (2013.01); *B60L 2270/145* (2013.01); *F02N 11/04* (2013.01); *G01M 15/046* (2013.01)

(58) Field of Classification Search
CPC ........ F16F 15/26; F02B 75/06; Y10T 74/2183
USPC ...................................................... 123/192.2
See application file for complete search history.

(56) References Cited

U.S. PATENT DOCUMENTS

| | | | | |
|---|---|---|---|---|
| 6,601,557 | B1* | 8/2003 | Hayman | F01M 1/02 |
| | | | | 123/192.2 |
| 2003/0075122 | A1* | 4/2003 | Yamashita | F02B 75/22 |
| | | | | 123/54.5 |
| 2005/0107194 | A1* | 5/2005 | Oishi | F02B 75/16 |
| | | | | 474/28 |
| 2008/0017157 | A1* | 1/2008 | Masuda | F16F 15/126 |
| | | | | 123/192.2 |
| 2010/0063674 | A1* | 3/2010 | Karolak | G01M 15/05 |
| | | | | 701/33.4 |
| 2012/0037110 | A1* | 2/2012 | Perkins | F16F 15/26 |
| | | | | 123/192.2 |
| 2013/0000589 | A1* | 1/2013 | Roehrig | F16F 15/26 |
| | | | | 123/192.2 |
| 2018/0373023 | A1* | 12/2018 | Fujii | G02B 26/008 |
| 2019/0085937 | A1* | 3/2019 | Suezaki | F16C 3/08 |

* cited by examiner

*Primary Examiner* — Long T Tran
*Assistant Examiner* — James J Kim
(74) *Attorney, Agent, or Firm* — Mark A Pitchford; Pitchford Fugett, PLLC

(57) ABSTRACT

An unbalanced crankshaft mounted accessory is configured to externally balance the rotating assembly of a particular engine model. In one embodiment, the unbalanced crankshaft mounted accessory is attached to the crankshaft at the output of the crankshaft (i.e., the connection to a load driven by the engine). The accessory is unbalanced at an angle and weight configured to reduce deflection of the crankshaft at the output of the crankshaft (when the unbalanced crankshaft mounted accessory is attached). The weight and angle are determined by measuring crankshaft deflection at various speeds (rpm) throughout the recommended operating range of the engine. The angle and deflection distance are then averaged and multiplied against a rotating mass of the engine and a constant to determine an angle and weight for the unbalanced crankshaft mounted accessory.

10 Claims, 5 Drawing Sheets

ENGINE COUNTERBALANCED BY UNBALANCED CRANKSHAFT MOUNTED ACCESSORY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to engine balancing. More particularly, this invention pertains to systems and methods for externally balancing engine rotating assemblies.

Engines include a block, rotating assembly, and a number of components for metering fuel, controlling air fuel ratios, and providing electrical power or other services to a load associated with the engine. Harmonic balancers are used on a front of a crankshaft of an engine to reduce crankshaft vibrations of the engine caused by movement of the rotating assembly about the crankshaft centerline. Harmonic balancers have moveable internal components that automatically move into position to counter vibrations at the front of the crankshaft. Harmonic balancers add weight to the rotating mass of the engine reducing performance and add size to the engine. The rear of the crankshaft drives a load associated with the engine (e.g., a vehicle drivetrain). Harmonic balancers reduce crankshaft deflection at a front of the crankshaft, not the rear or output of the crankshaft. Thus, a harmonic balancer does not prevent deflection of the crankshaft at the output or rear of the crankshaft which allows significant vibration transfer to the load or drivetrain driven by the crankshaft. The rear of a crankshaft is generally left unbalanced because the rear is mated to the load and adding a second harmonic balancer would extend the effective crankshaft length, reducing the strength of the driveline and further adding weight to the crankshaft, reducing effective engine performance and strength.

In some high-performance applications, components of the rotating assembly including the crankshaft are manually balanced. That is, piston and piston rods are lightened such that all pistons weigh the same amount (within a margin of error), and the crankshaft (i.e., the crank) is balanced with respect to a midpoint of the crankshaft. The crankshaft may also be dynamically balanced by spinning the crankshaft (without the rotating assembly attached) at a fixed rotational speed of between approximately 750 rpm and 1100 rpm and removing material from the front and rear web to reduce bending or oscillation of the crankshaft at the output. However, spinning the crankshaft at a fixed speed just above idle using bob weights instead of the rotating assembly components (i.e., connecting rods, pistons, etc.) will not give an indication of the harmonics of the entire rotating assembly. Thus, though vibration is significantly improved by manually, internally balancing the crankshaft, the rotating assembly may still vibrate at various rotating speeds and transfer such vibrations to the load (e.g., drivetrain) and frame supporting the engine.

BRIEF SUMMARY OF THE INVENTION

Aspects of the present invention provide a crankshaft mounted accessory that is unbalanced. The unbalanced crankshaft mounted accessory is configured to externally balance the rotating assembly of a particular engine model. In one embodiment, the unbalanced crankshaft mounted accessory is attached to the crankshaft at the output of the crankshaft (i.e., the connection to a load driven by the engine). The accessory is unbalanced at an angle and weight configured to reduce deflection of the crankshaft at the output of the crankshaft (when the unbalanced crankshaft mounted accessory is attached). The weight and angle are determined by measuring crankshaft deflection at various speeds (rpm) throughout the recommended operating range of the engine. The angle and deflection distance are then averaged and multiplied against a rotating mass of the engine and a constant to determine an angle and weight for the unbalanced crankshaft mounted accessory. Because each engine model has a given configuration (i.e., number of cylinders, rod size and length, piston size and length, angle between cylinders, etc.), each model has very similar harmonic characteristics that are largely corrected by an unbalanced crankshaft mounted accessory configured for that engine model or type. That is, the unbalanced crankshaft mounted accessory can be mass produced having a given angle and weight of counterbalance and need not be adjusted for each individual engine in order to dramatically reduce engine vibration.

In one aspect, a method of balancing a rotating assembly of an engine wherein the rotating assembly includes a crankshaft or crankshaft includes determining a counterbalance weight and angle for a crankshaft mounted accessory of the engine. An unbalanced crankshaft mounted accessory is affixed to the crankshaft. The unbalanced crankshaft mounted accessory has the determine counterbalance weight and angle for the crankshaft mounted accessory.

In another aspect, and engine includes a rotating assembly and an unbalanced crankshaft mounted accessory. The rotating assembly includes a crankshaft configured to provide kinetic energy to a load. The unbalanced crankshaft mounted accessory is affixed to the crankshaft.

In another aspect, and unbalanced crankshaft mounted accessory for a selected engine model includes a surface, and at least one of: one or more windows or a weight. The surface of the crankshaft mounted accessory defines a plane. The plane defined by the surface of the unbalanced crankshaft mounted accessory is generally perpendicular to an axis of rotation of a crankshaft of the engine model when the unbalanced crankshaft mounted accessory is attached to the crankshaft. The one or more windows through the surface defining the plane is configured to unbalanced the crankshaft mounted accessory at an angle and weight corresponding to the selected engine model. The weight is affixed to the surface of the crankshaft mounted accessory and configured to unbalanced the crankshaft mounted accessory at an angle and weight corresponding to the selected engine model.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
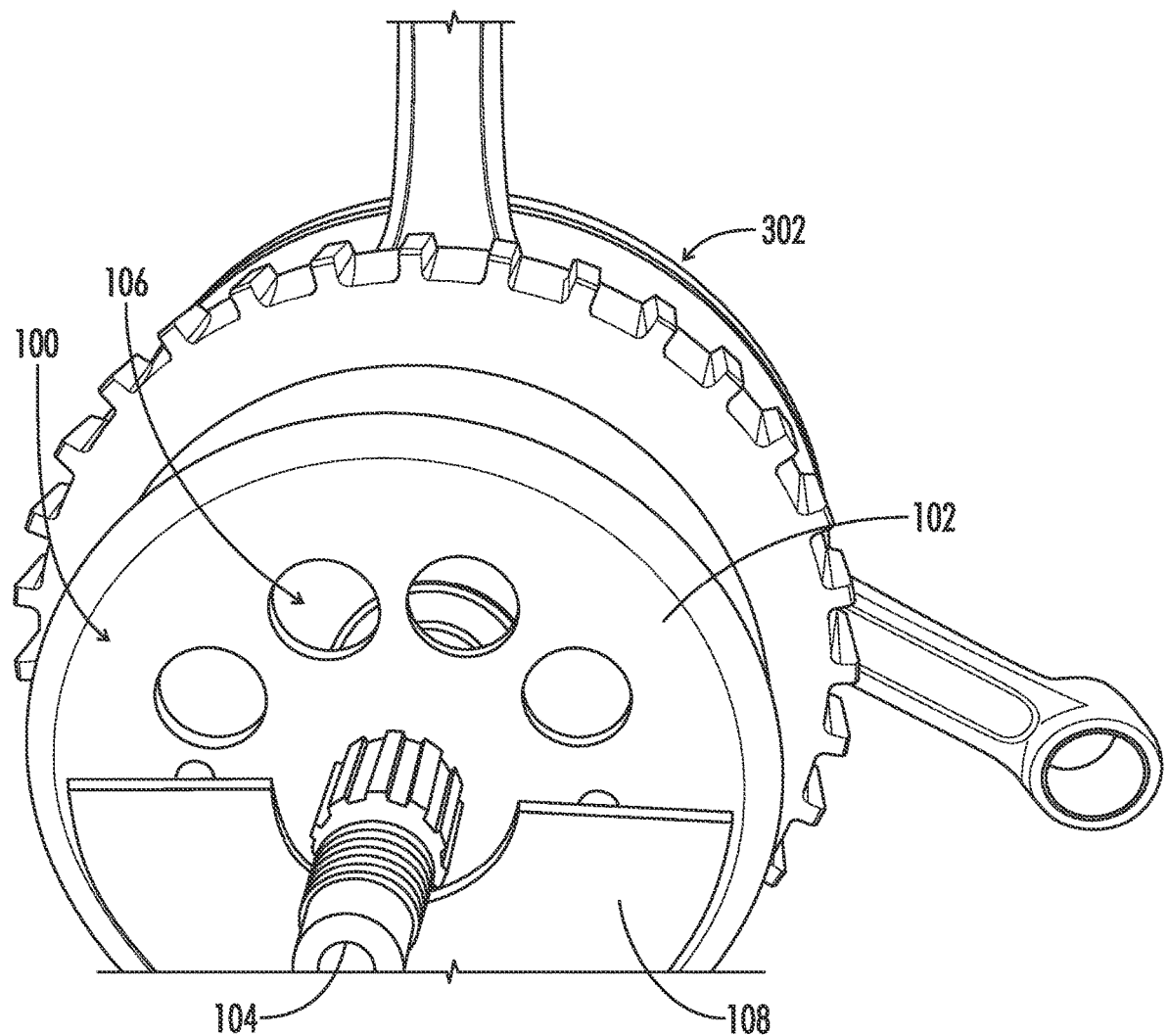
FIG. 1 is an elevated perspective view of a rotating assembly of an engine with an unbalanced crankshaft mounted accessory attached thereto.
Figure 2:
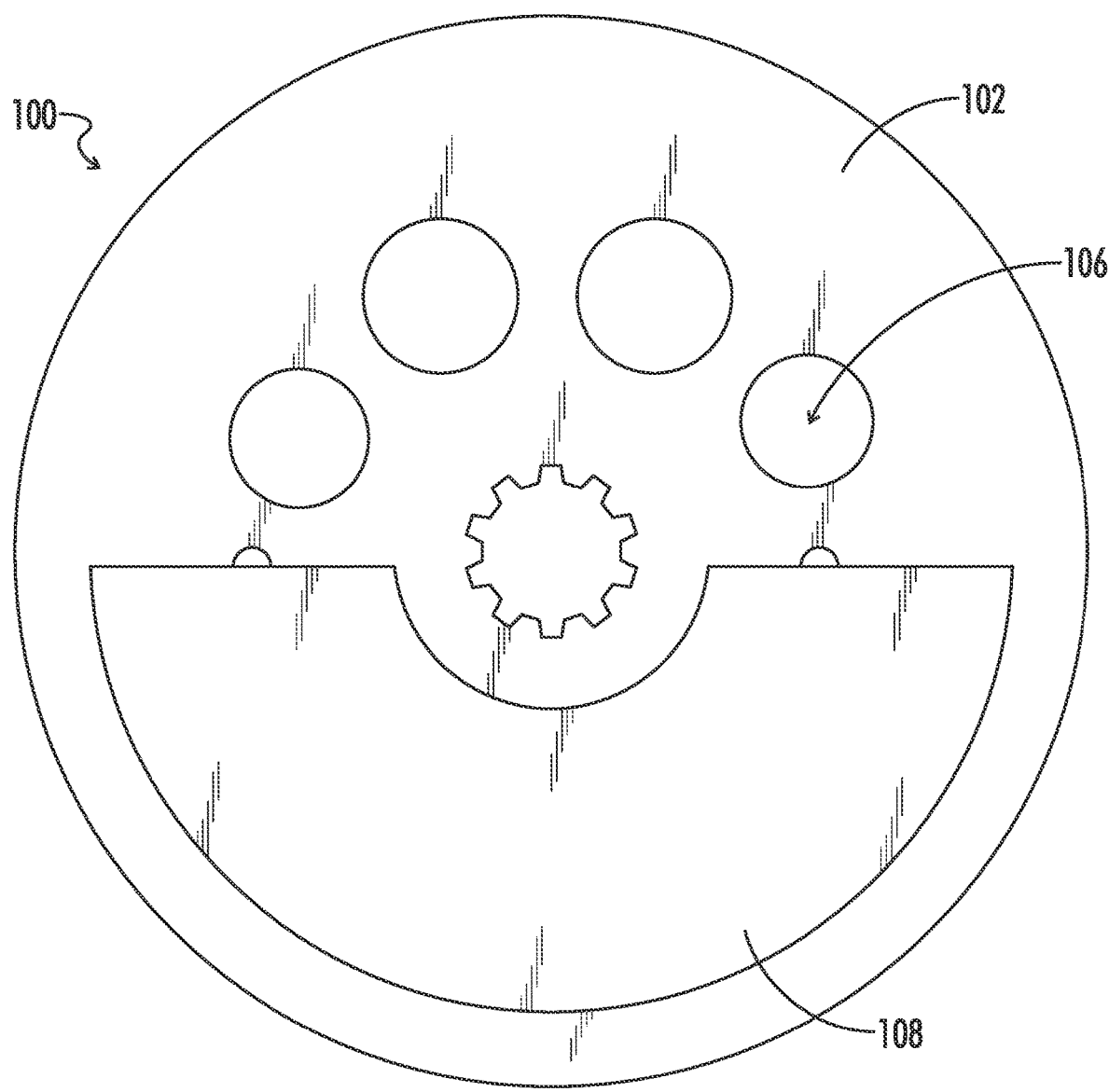
FIG. 2 is a side perspective view of the unbalanced crankshaft mounted accessory of FIG. 1.
Figure 3:
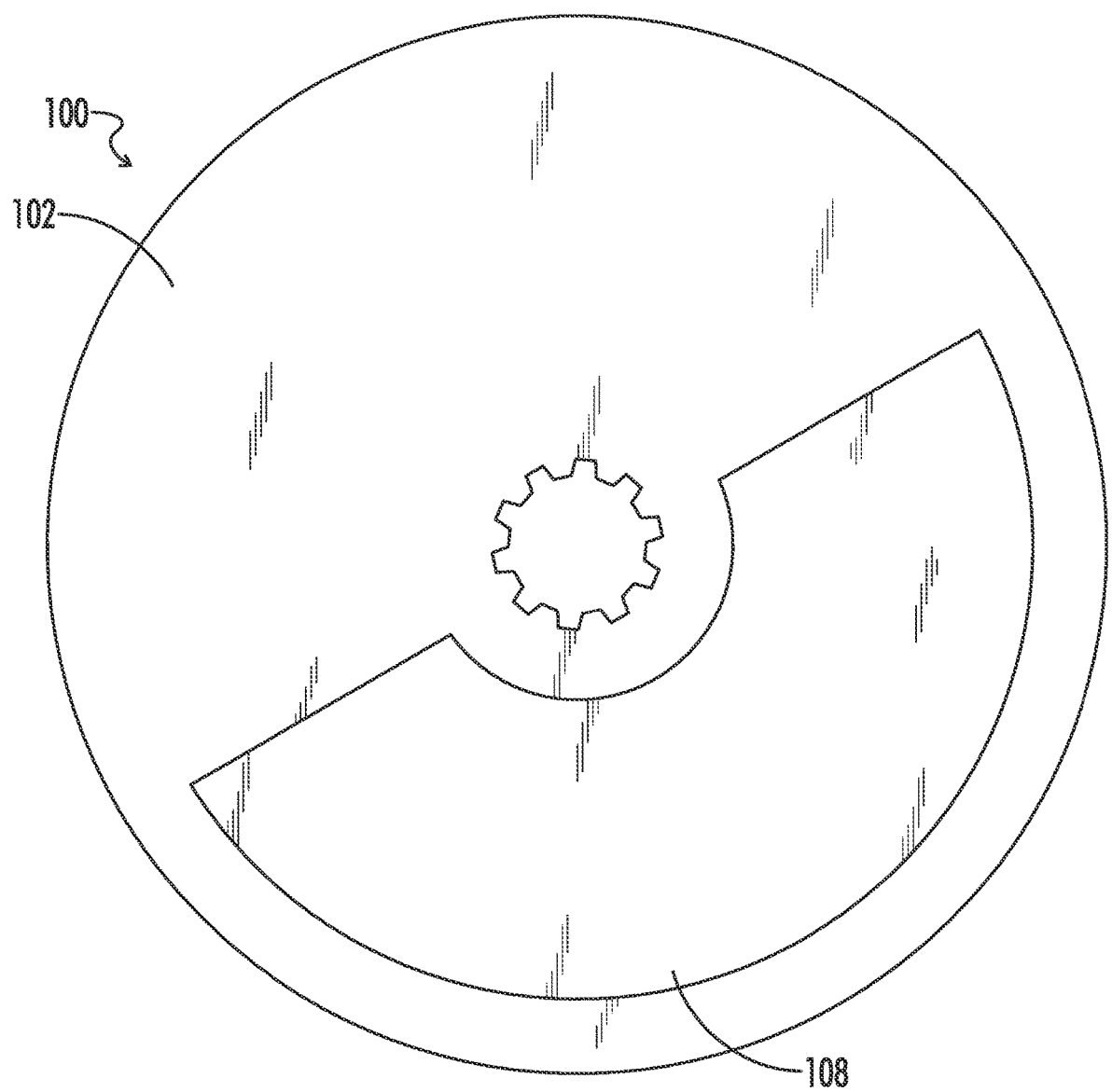
FIG. 3 is a side perspective view of an unbalanced crankshaft mounted accessory mounted thereto.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. The engine and crankshaft mounted accessory described herein are described with respect to a horizontal shaft engine, but it should be apparent to one of ordinary skill in the art that the measurements and unbalanced crankshaft mounted accessory described herein are equally applicable to vertical shaft engines. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

The terms "coupled" and "connected" mean at least either a direct electrical connection between the connected items or an indirect connection through one or more passive or active intermediary devices.

Referring to FIGS. 1-5, an unbalanced crankshaft mounted accessory 100 is configured for a selected engine model. In one embodiment, the crankshaft mounted accessory 100 includes a surface 102 defining a plane. The plane defined by the surface of the unbalanced crankshaft mounted accessory 100 is generally perpendicular to an axis of rotation of a crankshaft 104 of the engine model when the crankshaft mounted accessory is attached to the crankshaft 104. The unbalanced crankshaft mounted accessory 100 includes at least one of window 106 through the surface or a weight 108 attached to the surface defining the plane. The one or more windows are configured to unbalanced the crankshaft mounted accessory 100 at an angle and weight corresponding to the selected engine model. The weight 108 affixed to the surface of the crankshaft mounted accessory is configured to unbalanced the crankshaft mounted accessory at an angle and weight corresponding to the selected engine model. In some embodiments, the unbalanced crankshaft mounted accessory uses a combination of windows and weights to achieve the angle and weight corresponding to the selected engine model. It is contemplated within the scope of the claims that the windows 106 may include a single window or multiple windows, and that the weight may be a single piece or separated into multiple pieces. Further, the weight 108 may be integrated into the unbalanced crankshaft mounted accessory 100, and the weight 108 may be attached to the unbalanced crankshaft mounted accessory on an outer face of the unbalanced crankshaft mounted accessory 100 or an interface of the unbalanced crankshaft mounted accessory 100 opposite the outer face (i.e., surface 102), most visible in FIGS. 1, 2, and 3. Because the rotating assemblies of all engines of a particular engine model are similar in weight, length, hardness, and other materials affecting harmonic distortions of the rotating assembly, and externally mounted crankshaft mounted accessory configured to counterbalance the rotating assembly of the engine type has similar effects on all engines of that engine type or model. In one embodiment, the unbalanced crankshaft mounted accessory 100 is a rotor of an electric generator of the engine 300. In another embodiment, the unbalanced crankshaft mounted accessory 100 is at least one of a flywheel or a flex plate for the engine 304 engine model of the engine 300.

Figure 4:
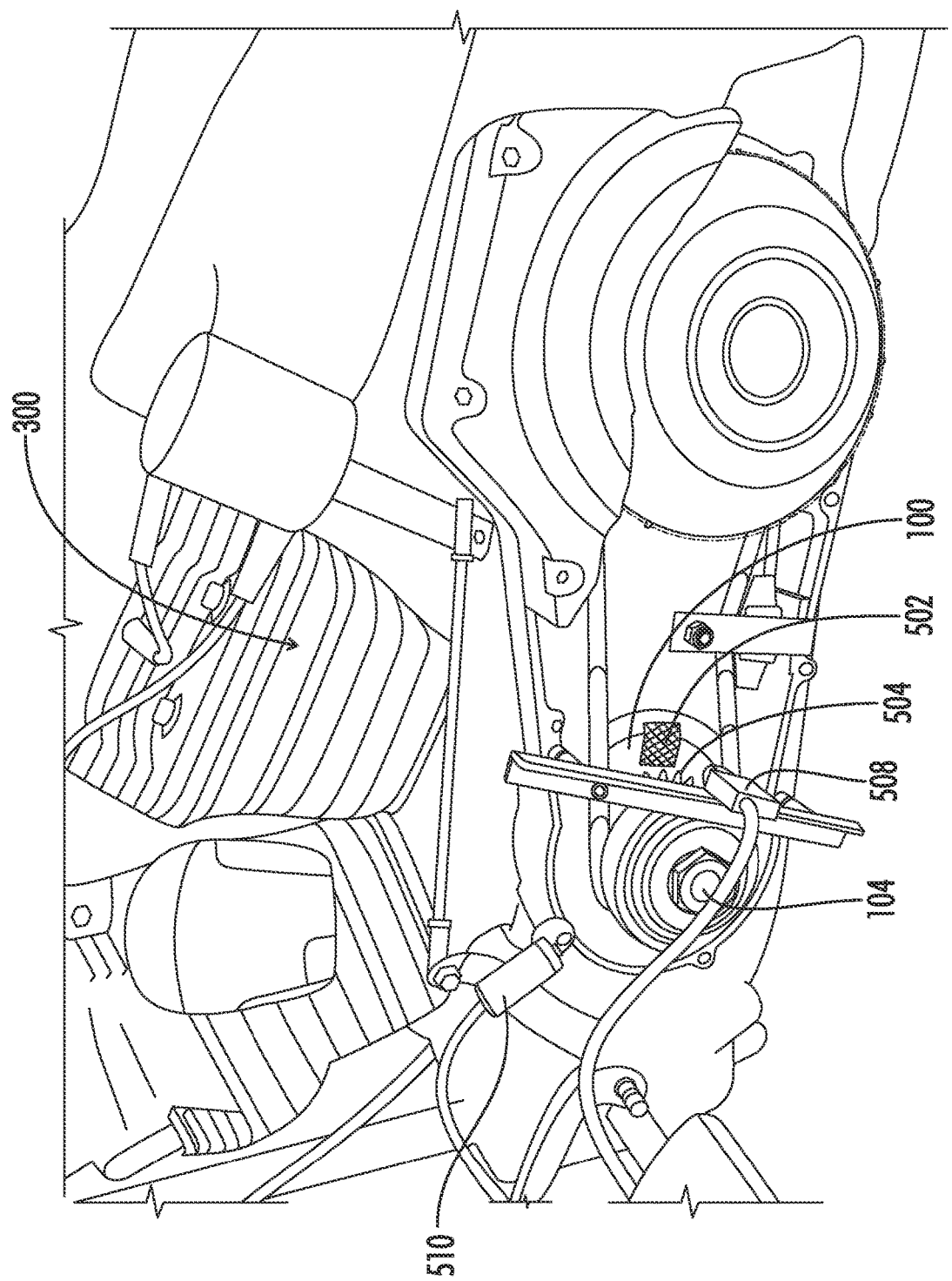
FIG. 4 is a side perspective view of a system for measuring runout of a crankshaft mounted accessory of an engine connected to a load, the engine corresponding to the accessory of FIGS. 1 and 2.
Figure 5:
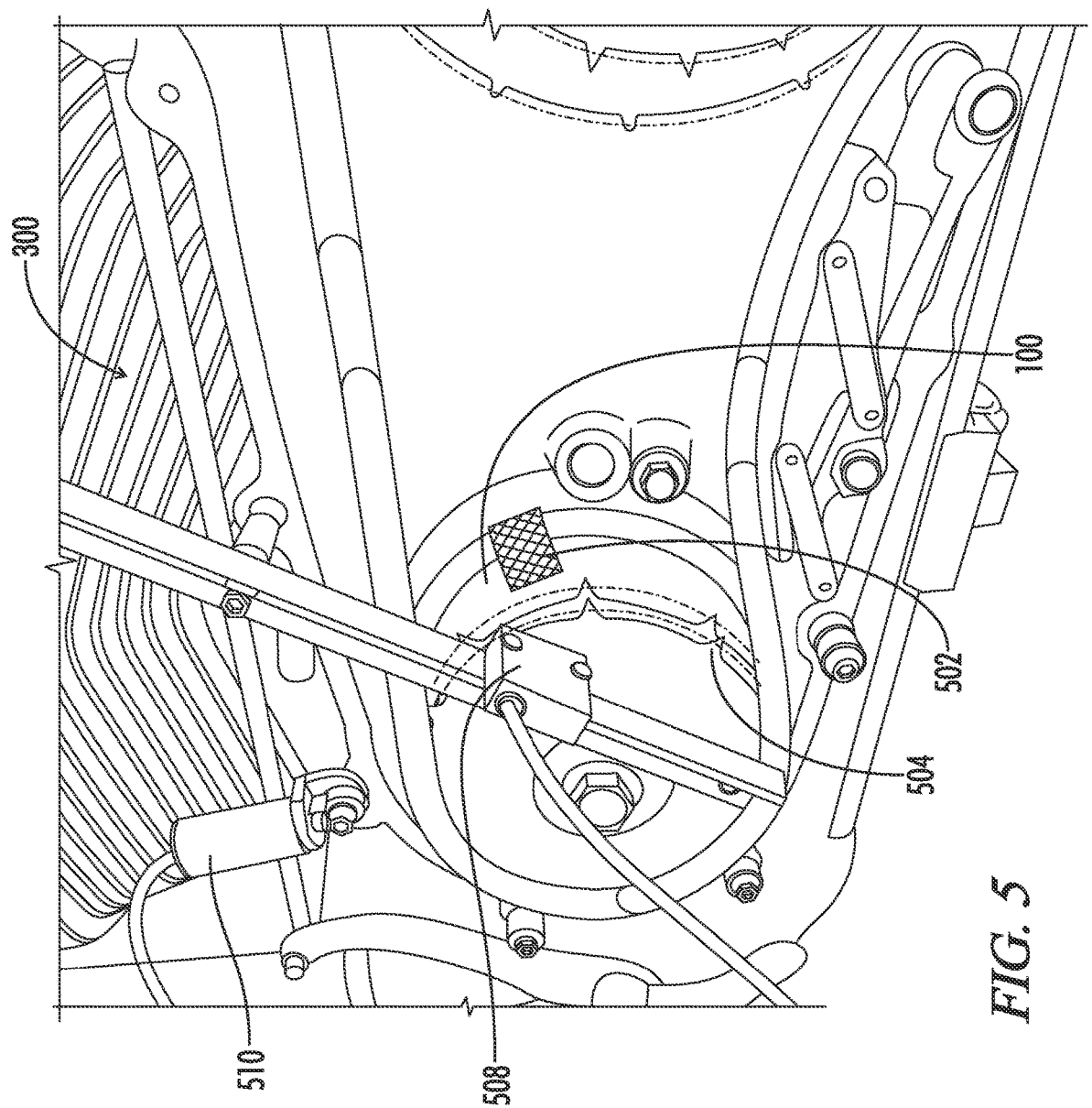
FIG. 5 is a side perspective view of a system for measuring runout of a crankshaft mounted accessory of an engine connected to a load, the engine corresponding to the accessory of FIG. 3.

Referring especially to FIGS. 4 and 5, a method of balancing a rotating assembly 302 of an engine 300 is shown. The method includes determining a counterbalance weight and angle for a crankshaft mounted accessory 100 of the engine 300. In one embodiment, determining the counterbalance weight and angle includes determining an engine model of the engine 300 and selecting the unbalanced crankshaft mounted accessory 100 as a function of the determined engine model of the engine 300.

In another embodiment, determining the counterbalance weight and angle includes affixing a reflector 502 to a component affixed to the crankshaft 104 (e.g. a crankshaft mounted accessory such as a rotor 100 or sprocket 504) to mark a rotational angle of 0°. This may be done with engine 300 at top dead center or any other point throughout a rotation, so long as the angle for the counterbalance weight is referenced with respect to the reflector 502. The rotating assembly 302 of the engine 300 is then rotated at each of a plurality of rotational speeds in a recommended RPM range of the engine 300 (i.e. engine model). In one embodiment, operating the engine 300 at each of a plurality of rotational speeds is done by starting the engine 300 which may result in more accurate measurements for the counterbalance weight and angle. While the engine is being rotated, a measurement system including the reflector 502, a reflector sensor 508, a run out sensor 510, and a controller measures the runout of the crankshaft mounted accessory 100 or a deflection distance of the crankshaft 104 (or crankshaft mounted accessory), and records a runout distance or deflection distance and angle with respect to the reflector 502. In one embodiment, a DynaVibe® GX series measurement system is used to determine the crankshaft deflection distance and angle. The term runout is being used interchangeably herein with "deflection distance" for simplicity. In real terms, the crankshaft 104 and crankshaft mounted accessory may have a true runout of zero inches. However, as the rotating assembly 302 operates (i.e., rotates throughout the recommended RPM range of the engine 300) and bends the crankshaft 104 momentarily, the crankshaft 104 and crankshaft mounted accessory 100 will appear to have runout due to deflection of the crankshaft 104 from its straight and true configuration. The angle and amount of maximum runout (i.e., deflection distance) is recorded for each of the predetermined RPMs throughout the recommended operating range of the engine 300. At least one property of the rotating assembly 302 is determined, and the counterbalance weight and angle is determined as a function of the collected measurements and the determined property of the rotating assembly 302. In one embodiment, the determined property of the rotating assembly is a mass of the rotating assembly. In other embodiments, properties of rotating assembly may include hardness of the crankshaft 104, length of the crankshaft 104, crankshaft diameter, or other measurements. During testing, the crankshaft mounted accessory 100 mounted to the engine 300 via the crankshaft 104 is balanced. In one embodiment, measuring the deflection distance of the crankshaft 104 includes measuring a deflection distance of the crankshaft mounted accessory other than the crankshaft mounted accessory to which the reflector 502 is affixed. In one embodiment, during testing the rotating assembly 302 is assembled in a block of the engine 300 and the engine 300 is connected to a load such as a drivetrain. The crankshaft 104 is configured to provide kinetic energy to a load such as the drivetrain.

In one embodiment, determining the counterbalance weight and angle is a function of the collected measurements and the determined property of the rotating assembly 302 includes determining an average angle and flexion distance from the measured angles and deflection distances at the plurality of rotational speeds wherein the plurality of rotational speeds are evenly spaced throughout the recommended RPM operating range of the engine 300 (i.e., engine model or type). The determined average counterbalance weight and angle is selected as the counterbalance weight and angle for the engine 300.

In another embodiment, determining the counterbalance weight and angle is a function of the collected measurements and the determined property of the rotating assembly 302 of the engine 300 includes determining a weighted average angle and deflection distance from the measured angles and deflection distances at the plurality rotational speeds. The measured angles and deflection distances at one or more rotational speeds at or near an expected operating rotational speed of the engine 300 are weighted more heavily than measured angles and deflection distances at rotational speeds further from the expected operating rotational speed of the engine 300. That is, if an engine such as a V twin for a Harley Davidson motorcycle is known to operate between 2500 and 3500 RPM at cruising speeds, then measurements taken at 2500 RPM, 3000 RPM, and 3500 RPM are weighted more heavily than measurements collected at other RPMs within the recommended RPM operating range of the engine. The determined weighted average counterbalance weight and angle is then selected as the counterbalance weight and angle for the engine 300.

It should be obvious to one of ordinary skill in the art that in order to counterbalance the engine, the determined counterbalance angle is 180° off from the determined average angle of the maximum runout or deflection distance of the crankshaft 104 of the engine 300.

The method concludes with affixing or attaching an unbalanced crankshaft mounted accessory 100 having the determined weight and angle to counterbalance the rotating assembly 302 of the engine 300 to the crankshaft 104, thus balancing the engine 300.

In testing, the method and systems described herein have been shown to reduce vibration and crankshaft deflection by approximately 50% even for engines with manually balanced rotating assemblies. For engines which have not been manually balanced, the unbalanced crankshaft mounted accessory corresponding to the engine model or type has been shown in testing to reduce vibration and crankshaft deflection of the engine throughout the operating range (i.e., recommended operating RPM of the engine model) of the engine. These results are even more exceptional because externally counterbalancing the engine at the output to the load drastically reduces vibration transmitted to the load (e.g., drivetrain), resulting in improved fuel economy and greatly reduced vibration transmitted throughout a frame supporting the engine and load (e.g., a motorcycle carrying the engine and drivetrain driven by the engine). In contrast, manually balancing engine internals still allows significant crankshaft deflection resulting in vibration transmission to the load and throughout a frame supporting the engine and load. Further, externally counterbalancing the engine with the unbalanced crankshaft mounted accessory herein has been shown to increase power to the ground in motorcycles (and in other vehicles) because energy is more smoothly transmitted to the load or drivetrain and less energy is wasted on vibration, noise, and heat.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful ENGINE COUNTERBALANCED BY UNBALANCED CRANKSHAFT MOUNTED ACCESSORY it is not intended that such references be construed as limitations upon the scope of this invention except as set forth in the following claims

What is claimed is:

1. A method of balancing a rotating assembly of an engine wherein the rotating assembly comprises a crankshaft, said method comprising:
    determining a counterbalance weight and angle for a crankshaft mounted accessory of the engine; and
    affixing an unbalanced crankshaft mounted accessory to the crankshaft, wherein the unbalanced crankshaft mounted accessory has the determined counterbalance weight and angle for the crankshaft mounted accessory, wherein determining the counterbalance weight and angle comprises:
    affixing a reflector to a component affixed to the crankshaft to mark a rotational angle of zero degrees;
    rotating the rotating assembly of the engine at a plurality of rotational speeds in a recommended rpm range of the engine;
    collecting measurements comprising an angle relative to the reflector and a deflection distance of the crankshaft at each speed of the plurality of rotational speeds of the engine;
    determining at least one property of the rotating assembly, said at least one property comprising mass; and
    determining the counterbalance weight and angle as a function of the collected measurements and the determined property of the rotating assembly.

2. The method of claim 1, wherein determining the counterbalance weight and angle further comprises affixing the crankshaft mounted accessory to the crankshaft, wherein the crankshaft mounted accessory is balanced.

3. The method of claim 1, wherein measuring the deflection distance of the crankshaft comprises measuring a deflection distance of the crankshaft mounted accessory.

4. The method of claim 1, wherein measuring the deflection distance of the crankshaft comprises measuring a deflection distance of a crankshaft mounted accessory other than the crankshaft mounted accessory to which the reflector is affixed.

5. The method of claim 1, wherein the rotating assembly is assembled in a block of the engine, and the engine is connected to a load, wherein the load is a drivetrain.

6. The method of claim 1, wherein determining the counterbalance weight and angle as a function of the collected measurements and the determined property of the rotating assembly comprises:
    determining an average angle and deflection distance from the measured angles and deflection distances at the plurality of rotational speeds, wherein the plurality of rotational speeds are evenly spaced throughout a recommended operating range of the engine; and
    selecting the determined average counterbalance weight and angle as the counterbalance weight and angle for the engine.

7. The method of claim 1, wherein determining the counterbalance weight and angle as a function of the collected measurements and the determined property of the rotating assembly comprises:
    determining a weighted average angle and deflection distance from the measured angles and deflection distances at the plurality of rotational speeds, wherein the measured angles and deflection distances at one or more rotational speeds at or near an expected operating rotational speed of the engine are weighted more heavily than measured angles and deflection distances at rotational speeds further from the expected operating rotational speed of the engine; and
    selecting the determined weighted average counterbalance weight and angle as the counterbalance weight and angle for the engine.

8. The method of claim 1, wherein the unbalanced crankshaft mounted accessory is a rotor of an electric generator.

9. The method of claim 1, wherein the unbalanced crankshaft accessory is at least one of a flywheel or a flexplate.

10. The method of claim 1, wherein:
    the unbalanced crankshaft mounted accessory has a surface that defines a plane;
    the plane defined by the unbalanced crankshaft mounted accessory is generally perpendicular to an axis of rotation of the crankshaft when the unbalanced crankshaft mounted accessory is attached to the crankshaft; and
    the unbalanced crankshaft mounted accessory comprises:
    one or more windows through the surface defining the plane, said series of windows configured to unbalance the crankshaft mounted accessory; and
    a weight affixed to the surface of the crankshaft amounted accessory radially opposite the windows such that the weight cooperates with the windows to unbalance the crankshaft mounted accessory.

* * * * *